(12) United States Patent
Ducheneaut et al.

(10) Patent No.: US 7,743,067 B2
(45) Date of Patent: Jun. 22, 2010

(54) MIXED-MODEL RECOMMENDER FOR LEISURE ACTIVITIES

(75) Inventors: Nicholas B. Ducheneaut, Sunnyvale, CA (US); Robert R. Price, Palo Alto, CA (US); Kurt E. Partridge, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 323 days.

(21) Appl. No.: 11/856,913

(22) Filed: Sep. 18, 2007

(65) Prior Publication Data

US 2009/0077057 A1 Mar. 19, 2009

(51) Int. Cl.
*G06F 17/30* (2006.01)
(52) U.S. Cl. .................. 707/769; 707/999.1; 707/999.2
(58) Field of Classification Search .................. 707/769, 707/999.001, 999.003, 999.1, 999.2
See application file for complete search history.

(56) References Cited

U.S. PATENT DOCUMENTS

2002/0188589 A1 12/2002 Salmenkaita

FOREIGN PATENT DOCUMENTS

WO 0208854 A2 1/2002

OTHER PUBLICATIONS

Glance et al, Making Recommender Systems Work for Organizations, 1999, PAAM, pp. 1-20.*
Shahabi et al, A Unified Framework to Incorporate Soft Query Into Image Retrieval Systems, Jul. 2001, ICEIS, pp. 1-9.*

* cited by examiner

*Primary Examiner*—Fred I Ehichioya
(74) *Attorney, Agent, or Firm*—Park, Vaughn & Fleming LLP; Shun Yao

(57) ABSTRACT

One embodiment of the present invention provides a method for recommending leisure activities to a user. During operation, the system receives at least one query for leisure activities. The system then determines a collaborative filtering score of a candidate activity based on a collaborative filtering model, a soft query score for the candidate activity based on a soft query model, a content preference score for the candidate activity based on a content preference model and the user's past behavior, and a distance score for the candidate activity based on a distance model. Next, the system generates a composite score for the candidate activity by calculating a weighted average of the collaborative filtering score, the soft query score, the content preference score, and the distance score. The system further returns a recommendation list containing the activities with the highest composite scores.

21 Claims, 6 Drawing Sheets

MIXED-MODEL RECOMMENDER FOR LEISURE ACTIVITIES

BACKGROUND

1. Field of the Invention

The present disclosure relates to a recommender system. More specifically, the present disclosure relates to a recommender system incorporating four utility models for making recommendations about leisure activities.

2. Related Art

The purpose of most recommendation systems is to help individuals discover items they might not necessarily be able to find on their own. In today's technologically-oriented society, a primary source of such recommendations is a specialized "recommender system." Such a recommender system can generate personalized recommendations in response to a query from a user. A user submits a query indicating certain interests, such as a person, place, books, films, music, web content, abstract idea, etc., and the recommender system rates the items within interest scope and generates a recommendation.

SUMMARY

One embodiment of the present invention provides a method for recommending leisure activities to a user. During operation, the system receives at least one query for leisure activities. The system then determines a collaborative filtering score of a candidate activity based on a collaborative filtering model, a soft query score for the candidate activity based on a soft query model, a content preference score for the candidate activity based on a content preference model and the user's past behavior, and a distance score for the candidate activity based on a distance model. Next, the system generates a composite score for the candidate activity by calculating a weighted average of the collaborative filtering score, the soft query score, the content preference score, and the distance score. The system further returns a recommendation list containing the activities with the highest composite scores.

In a variation of this embodiment, determining the collaborative filtering score involves receiving a set of user-profiling information.

In a variation of this embodiment, determining the collaborative filtering score involves retrieving one or more ratings for the candidate activity submitted by other users in a same profile group to which the user is matched.

In a variation of this embodiment, determining the soft query score involves receiving preference information from the user.

In a variation of this embodiment, determining the content preference score involves extracting a set of keywords from a set of content previously accessed by the user and determining whether a description of the candidate activity matches any of the keywords.

In a variation of this embodiment, determining the distance score involves computing a distance between a location associated with the candidate activity and a location associated with the user.

In a further variation, determining the distance score further involves receiving a set of GPS coordinates and computing a motion range for the user.

DETAILED DESCRIPTION

Figure 1:
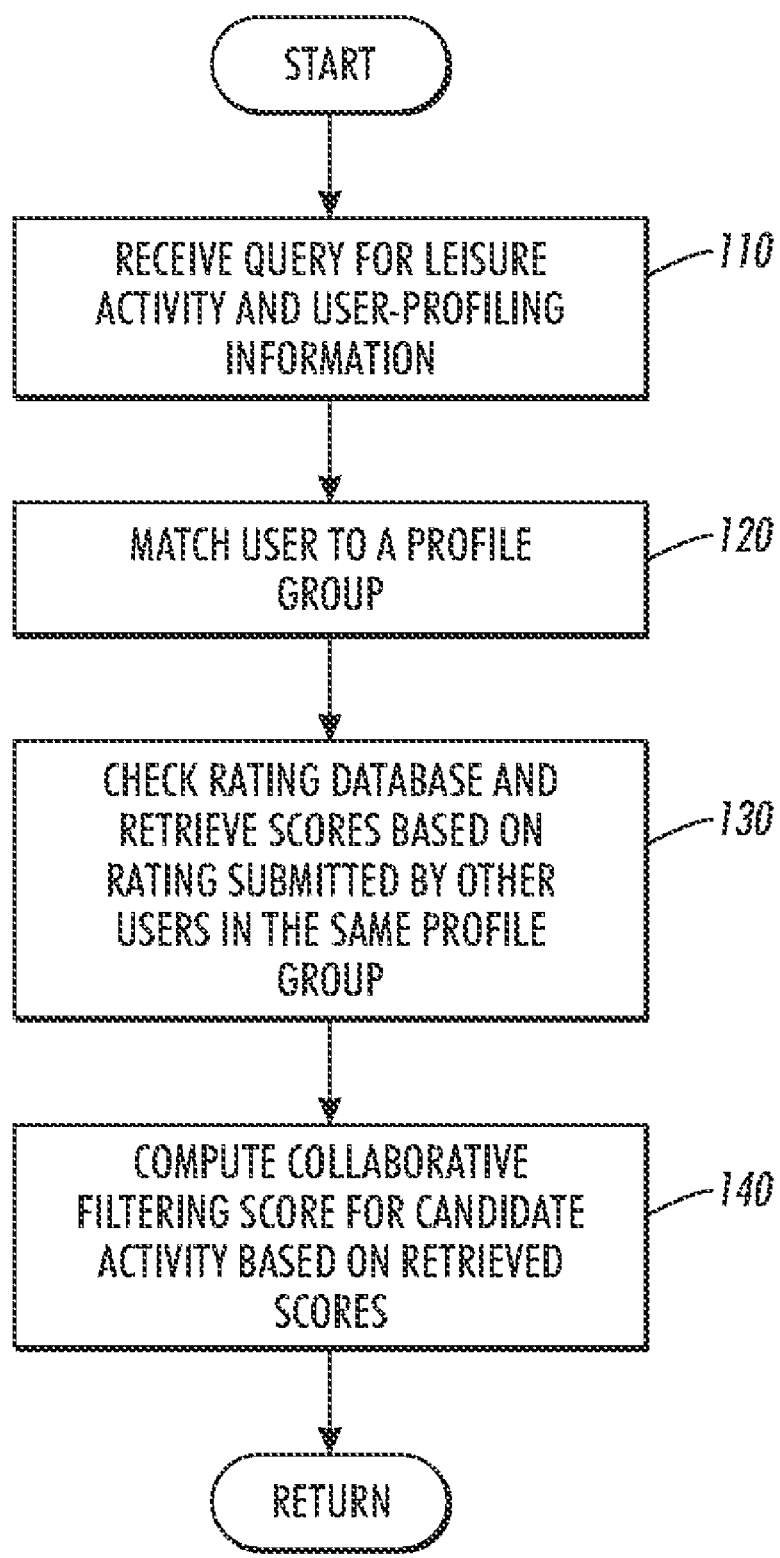
FIG. 1 presents a flow chart illustrating an exemplary process of computing scores for a leisure activity using a collaborative filtering model in accordance with one embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), Application-Specific Integrated Circuits (ASICs), Field Programmable Gate Arrays (FPGAs), or other media capable of storing computer readable media now known or later developed.

Overview

Most, if not all, conventional recommender systems recommend only one type of items a user is interested in. Therefore, these systems are not able to generate recommendations for a query that is open to a wide scope of items. For example, a conventional recommender system may recommend books or films, but not both at the same time. A user would not be able to seek a recommendation for books and movies related to the same genre, and the query would have to be broken down into two separate queries.

It is therefore desirable for a user to be able to request recommendations about multiple types of items at once. A user might want to submit a query about leisure activities.

Leisure activities encompass a broad range of activities, such as watching a movie, dining at a restaurant, drinking at a bar, or visiting a museum. Therefore, a conventional recommender system would not be able to perform this task because it is unable to provide recommendations about items in multiple categories.

Embodiments of the present invention provide a leisure activity recommender system which incorporates four models to generate a recommendation list containing a number of leisure activities. These four models are a soft query model, a collaborative filtering model, a content preference model, and a distance model. In one embodiment, the recommender system first computes four separate scores for a candidate leisure activity using these four models, and then calculates a composite score based on these four scores. Subsequently, the recommender system ranks the leisure activities and returns a recommendation list containing a number of activities with the highest composite scores.

Note that the choice of a model is related to what type of data is used to perform the comparison or inference in order to generate recommendations. In addition, a model evaluates a set of attributes that are relevant to the type of data used in generating recommendations. For example, the collaborative filtering model is based on a user's profile and other people's preferences, and the soft query model is based on the user's own preferences.

In computing the final composite score, the system can use a variety of algorithms. For example, the system can use an arithmetic mean of all the individual scores. The system can also use weighted mean or other approaches to compute the final composite score. In addition, the parameters or formula used in computing the final score can be modified or tuned based on system configuration. In one embodiment, a respective model-specific score is a value ranging from 0.01 to 1.0. The final score for the item is a weighted mean of the four model-specific scores. The weight assigned to each score can be determined heuristically. Application developers can also choose the weight values differently based on their needs.

The following sections provide detailed description of each model.

Collaborative Filtering Model

Collaborative filtering predicts (or filters) the interests of a user by collecting taste information from many users ("collaborating"). The underlying assumption of a CF model is that those who agreed in the past tend to agree again in the future. For example, a collaborative filtering or recommendation system for music could make predictions about which music a user should like given a partial list of that user's tastes (likes or dislikes), or other user-profiling information. Such information can include but is not limited to user age, gender, income level, education level, location, occupation, etc. The system then uses such information to match the user with a larger pool of other users whose preferences are known to the system. Based on this preference information of similar users, the system can predict or recommend items to the current user.

Note that, although these predictions are specific to the user, the system uses information gleaned from many other users. This method differs from the simple approach of giving an average (non-user-specific) score for each item of interest, for example based on its number of votes. Therefore, collaborative filtering can generate recommendations tailored to a particular user's characteristics.

FIG. 1 presents a flow chart illustrating an exemplary process of computing scores for a leisure activity using a collaborative filtering model in accordance with one embodiment of the present invention. During operation, the system receives a scoring request for a leisure activity and some user-profiling information (operation 110). Note that the user may or may not specify what type of leisure activity he is looking for. For example, the user may specify that he would like to receive recommendation on live performances in his vicinity during a certain time period. The user may also just ask for a recommendation of any types of activity to kill the next three hours. Furthermore, the user-profiling information may or may not be provided by the user. In one embodiment, this information may be provided by the hand-held device the user uses as a client to the recommender system. In a further embodiment, the user-profiling information may be provided by a remote server that maintains a database which stores such information. In addition, the user-profiling information can be any explicit or implicit information from which the system can derive knowledge of the user's preferences. For example, the user's past choices, age, gender, education level, income level, occupation, etc.

After receiving the query and user-profiling information, the recommender system matches the user with a profile group based on the user-profiling information (operation 120). The system then checks a rating database associated with the candidate leisure activity and retrieves one or more ratings previously computed based on the ratings of the same leisure activity submitted by other users in the same profile group (operation 130). Note that a particular leisure activity, say eating at restaurant ABC, may be associated with several attributes, such as food quality, service, ambience, parking convenience, availability of smoking areas, etc. In one embodiment, the rating database can return specific ratings for each attribute.

The score of the candidate leisure activity is then computed based on the rating(s) returned by the rating database (operation 140). In one embodiment, the system computes the score by averaging, with or without weighting, the ratings for each attribute. The system can also optionally normalize the score value to a range from 0.01 to 1.0.

Soft Query Model

The soft query model is used to moderate the effect of collaborative filtering on the final recommendation by taking into account a user's broad preferences. In one embodiment, when using the recommender system for the first time, the user is asked to specify, for each activity type, which attributes they care about most. For example, for restaurants, the user can optionally specify that he prefers French cuisine above all other types, and he dos not want to eat in a restaurant where smoking is allowed. These preferences are then translated into a score for each attribute for a leisure activity. For instance, a restaurant serving French food would receive a score of 1.0 for the "food type" attribute. However, if smoking is allowed in this restaurant, it will receive a score of 0.01 for the "smoking or non-smoking" attribute. In one embodiment, the system can generate an average score for a leisure activity based on the scores for each attribute. Additionally, this averaging process may use a weighted average process, and allow the user to specify which attribute is more important to him.

Take the above restaurant as an example. If the user does not specify which attribute (i.e., food type or non-smoking) is more important to him, the overall score of the restaurant may be 0.5. If the user indicates that food is more important to him than eating in a non-smoking environment, the score may be higher than 0.5. If, on the other hand, eating in a smoke-free restaurant is very important to the user the score may be much lower than 0.5, for example 0.01. In this averaging process, the system can use any analytical, empirical, heuristic approach.

When the soft query score for a leisure activity is combined with scores for other models, the soft query model serves to dampen the final result based on the user's explicit preferences. For example, collaborative filtering might have assigned a score of 0.8 to a restaurant based on many similar users' ratings. However, if this is a restaurant where smoking is allowed, the final score for this item might not be higher than (0.8+0.01)/2–0.405, a much lower score which reflects the user's general preference.

For example, in one embodiment, a user asks the recommender system to recommend where to eat. After checking an attribute database associated with dining, the recommender system retrieves a set of attributes pertinent to restaurants. This set of attributes include, but are not limited to, type of cuisine, outdoor versus indoor dining, smoking or non-smoking, availability of valet parking, price range, availability of reservation, etc.

If the query about dining is submitted for the first time, the user is prompted to provide input for a set of preferences with respect to these attributes. In one embodiment, the preference for an attribute is represented in scores. Based on the user's preferences, a restaurant that serves French food may be given a score of 1.0 while one serves Thai food may be given a score of 0.8. In addition, a restaurant that prohibits smoking may be given a score of 1.0 whereas one that has dedicated smoking areas may be given a score of 0.01. The score of a restaurant for a restaurant is then computed by averaging the scores associated with all attributes.

Figure 2:
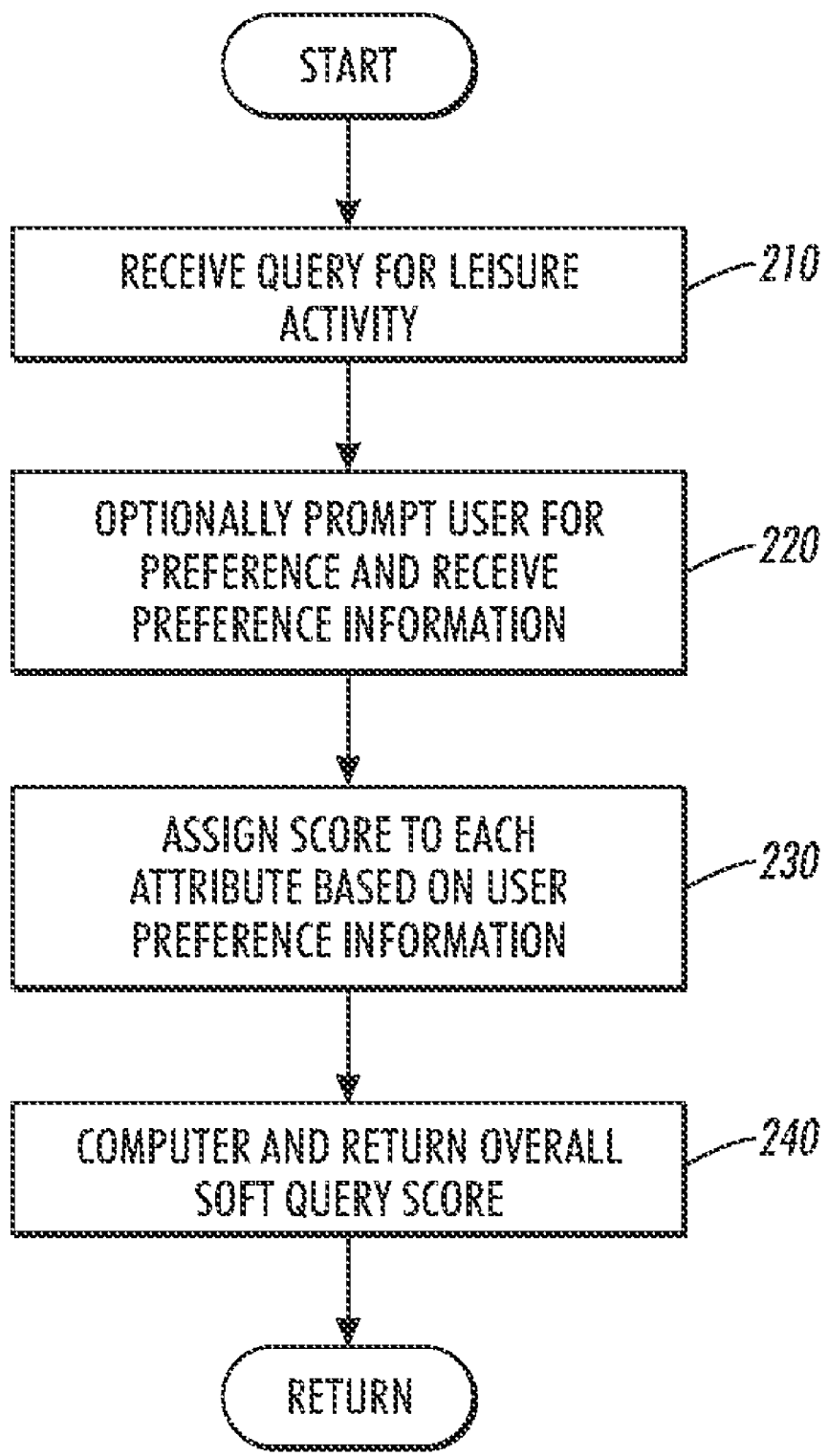
FIG. 2 presents a flow chart illustrating an exemplary process of computing scores for a leisure activity using a soft query model in accordance with one embodiment of the present invention.

FIG. 2 presents a flow chart illustrating an exemplary process of computing scores for a leisure activity using a soft query model in accordance with one embodiment of the present invention. During operation, the system receives a query for leisure activities (operation 210). In response, the system can optionally prompt the user to enter preferences for a type of activity and receives the preference information from the user (operation 220). Note that the user may or may not specify an activity type in the query. If an activity type is specified, the system can prompt the user for preferences only for that type of activity. Otherwise, the system can prompt the user for all possible activity types and allow the user to choose the type of activity for which he wants to enter preferences.

For a respective leisure activity among a list of candidates, the system then assign scores to each attribute of the leisure activity based on the user preference information (operation 230). Subsequently, the system computes and returns an overall soft query score for the leisure activity (operation 240).

Content Preference Model

The content preference model "boosts" the score of items that are semantically related to a user's current interests. In one embodiment, the system keeps track of the resources a user accesses online. For example, the system monitors the web sites the user has visited, his emails, instant messages, on-line chatting sessions, web-search keywords, etc., and extracts keywords representative of the corresponding topics. For example, a user might have been reading a lot about sailboats on the web. When recommending places to visit, each item in the database related to this topic, for example upcoming boat shows, would receive a score of 1.0 based on the content preference model, while other items relating to different topics would not receive this "boost." Consequently, topically relevant items would tend to "bubble up" to the top of the recommendation list.

For example, in one embodiment, a user asks the recommender system to recommend a place to visit. After searching a content database containing the user's temporary Internet cache files for the past few weeks, the recommender system extracts a number of keywords. Note that the system can use any computational-linguistic approach to extract keywords.

Subsequently, the recommender system searches a local activity database and assigns higher scores to candidate activities matching any of the keywords.

Figure 3:
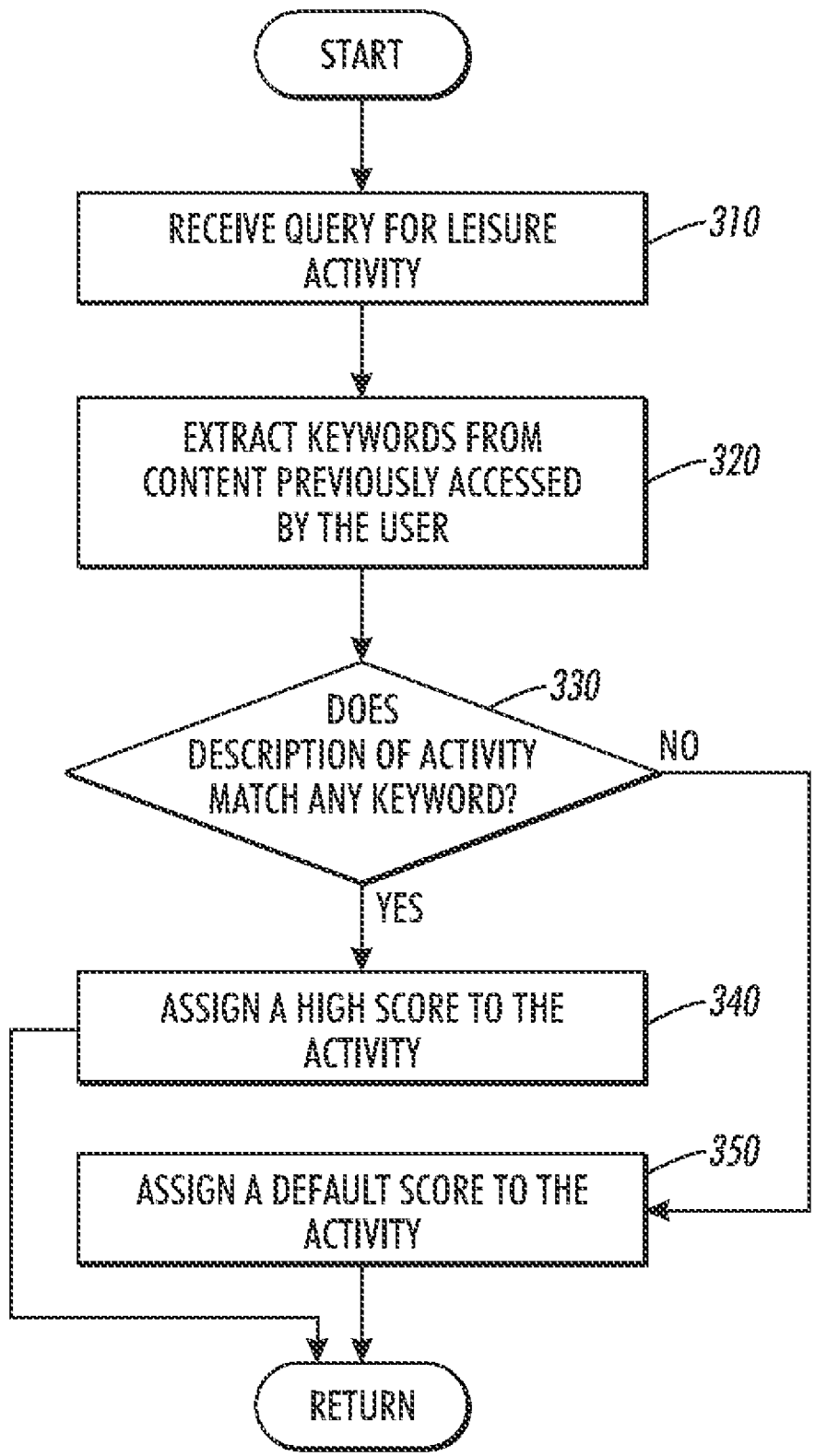
FIG. 3 presents a flow chart illustrating an exemplary process of computing scores for a leisure activity using a content preference model in accordance with one embodiment of the present invention.

FIG. 3 presents a flow chart illustrating an exemplary process of computing scores for a leisure activity using a content preference model in accordance with one embodiment of the present invention. During operation, the system receives a query for leisure activities (operation 310). The system then extracts keywords from content previously accessed by the user (operation 320).

For each leisure activity in a list of candidate activities, the system determines whether the description of the activity matches any of the keywords extracted from the content (operation 330). If there is a match, the system assigns a high score to the activity (operation 340). If the system does not identify a match, the system returns a default score value, for example a value of 0 (operation 350).

Distance Model

The distance model reduces the score of an item depending on the location of a candidate leisure activity, where the user is, and how mobile he can be. In one embodiment, the system receives a set of global positioning system (GPS) coordinates which reflect the user's current location and an estimate of the user's range of motion. In one embodiment, the system can compute this motion range based on the user's current speed. The system then assigns a score from 0.01, which indicates the activity is out of range, to 1.0, which indicates that the activity is in the user's immediate proximity. In this way, items that are not only relevant but also in close proximity tend to be favored in the final recommendation list.

Figure 4:
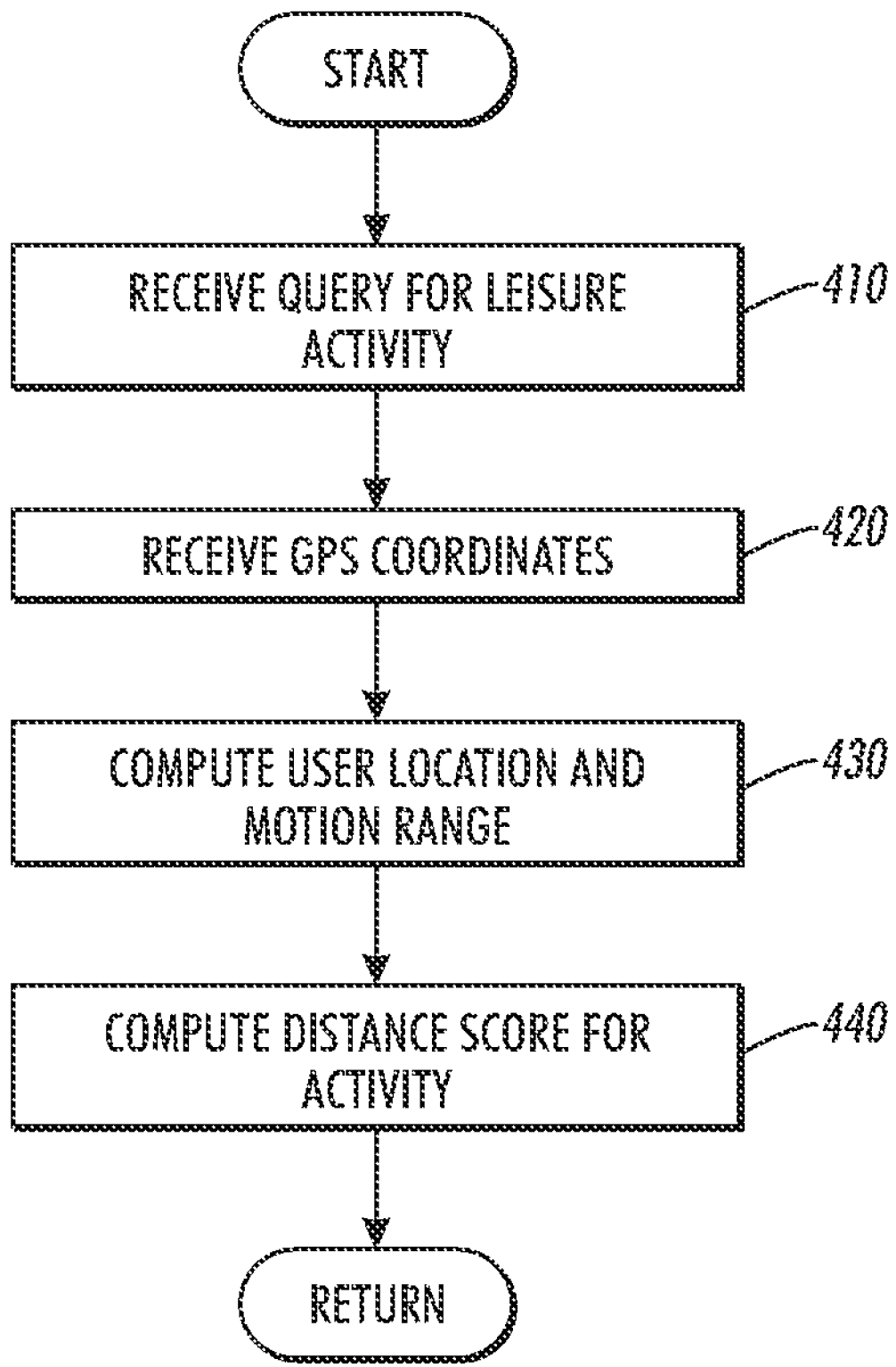
FIG. 4 presents a flow chart illustrating an exemplary process of computing scores for a leisure activity using an accessibility model in accordance with one embodiment of the present invention.

FIG. 4 presents a flow chart illustrating an exemplary process of computing scores for a leisure activity using an accessibility model in accordance with one embodiment of the present invention. During operation, the system receives a query for leisure activities (operation 410). The system further receives a set of GPS information which may include a set of coordinates associated with the user (operation 420).

The system subsequently computes the location and range of motion of the user based on the received GPS information (operation 430). Next, for every candidate leisure activity, the system assigns a distance model score based on the distance between the activity and the user's location, and the user's motion range (440). The system then returns the computed distance model score.

System Operation

Figure 5:
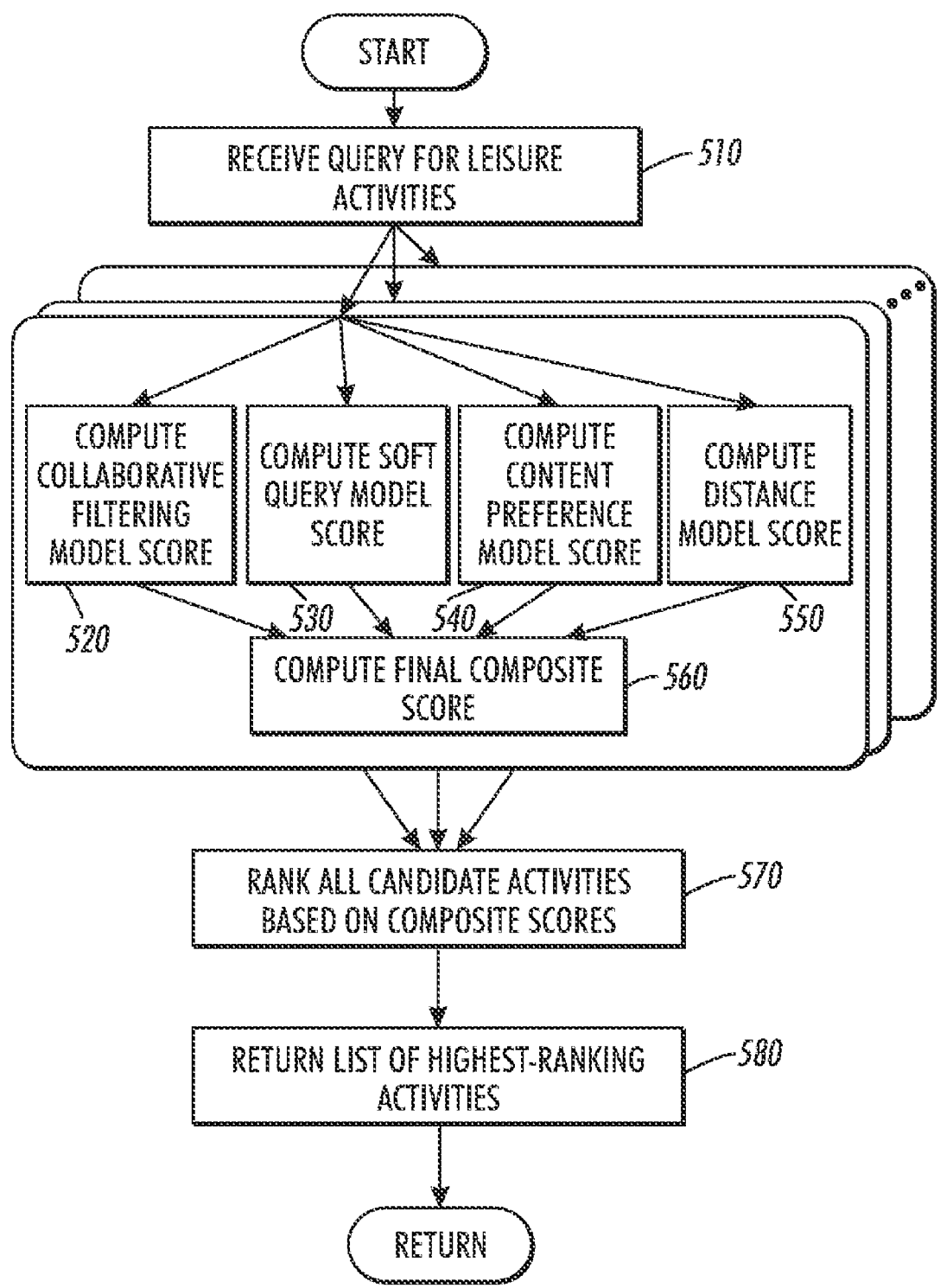
FIG. 5 presents a flow chart illustrating an exemplary process of recommending candidates for different types of leisure activities based on a final score generated from the four models in accordance with the present invention.

FIG. 5 presents a flow chart illustrating an exemplary process of recommending candidates for different types of leisure activities based on a final score generated from the four models in accordance with the present invention. During operation, the system receives a query for leisure activities (operation 510). Next, for each candidate leisure activity, the system computes four scores based on the four models. Specifically, the system computes a collative filtering model score (operation 520), a soft query model score (operation 530), a content preference model score (operation 540), and a distance model score (operation 550). The system then computes a final composite score for the candidate activity based on the four model-specific scores (operation 560).

Next, the system ranks all the candidate activities based on their respective composite scores (operation 570). The system then returns a list of highest-ranking activities to the user (operation 580).

Figure 6:
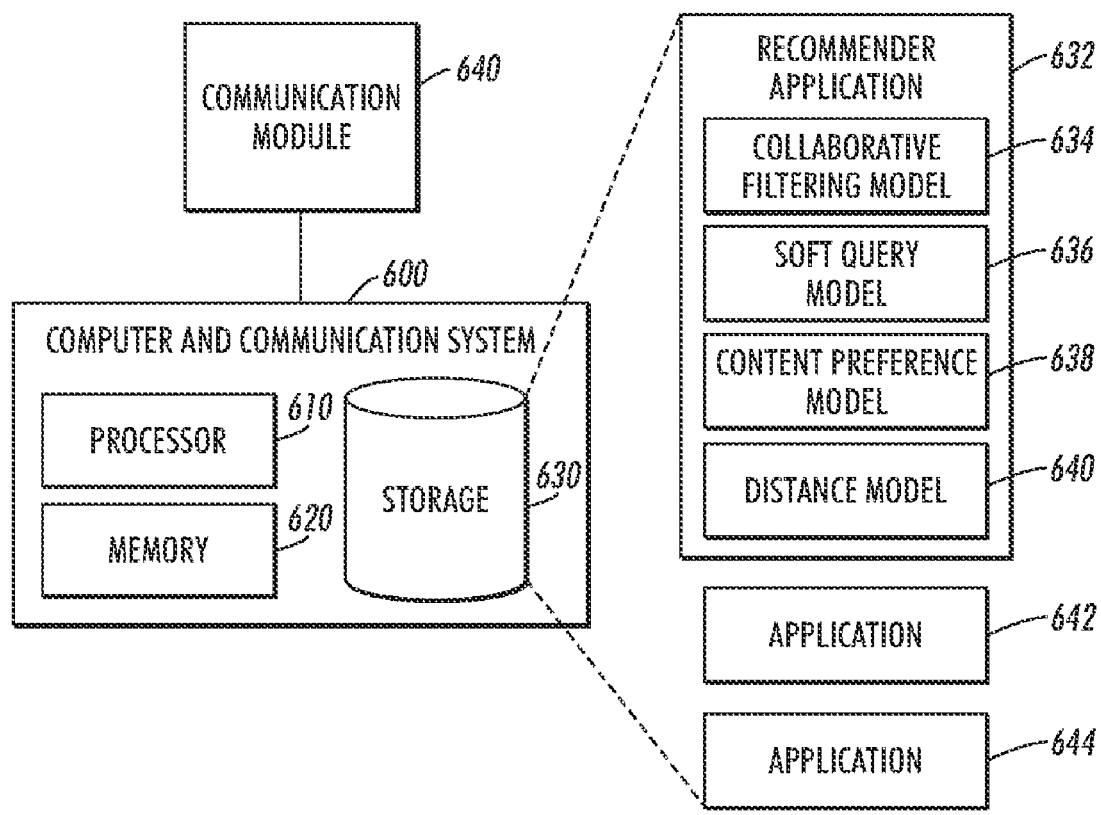
FIG. 6 illustrates an exemplary computer and communication system which facilitates a recommender system using four models in accordance with the present invention.

FIG. 6 illustrates an exemplary computer and communication system which facilitates a recommender system using four models in accordance with the present invention. A computer and communication system 600 is coupled to a communication module 640, and includes a processor 610, a memory 620, and a storage device 630. Storage device 630 stores a number of applications, such as applications 642 and 644. Storage device 630 also stores a recommender application 632, which includes a collaborative filtering model 634, a soft query model 636, a content preference module 638, and a distance model 640.

During operation, recommender application 632 is loaded from storage device 630 into memory 620, and then executed by processor 610 to recommend leisure activities to a user.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for recommending leisure activities to a user, the method comprising:
   receiving one query for leisure activities, which are associated with a plurality of activity types;
   determining by a computer a collaborative rating of a candidate activity by other users;
   determining by the computer the user's preference for the candidate activity based on a soft query on a set of attributes associated with the candidate activity;
   determining by the computer the user's interest in the candidate activity based on the user's past behavior;
   determining by the computer proximity of the candidate activity to the user's current location;
   generating by the computer a composite score for the candidate activity based on the type of the candidate activity and a combination of the collaborative rating, the user's preference, the user's interest, and the proximity of the candidate activity; and
   recommending to the user a list of leisure activities of different activity types based on composite scores of the leisure activities.

2. The method of claim 1, wherein determining the collaborative rating comprises receiving a set of user-profiling information.

3. The method of claim 1, wherein determining the collaborative rating comprises retrieving one or more ratings for the candidate activity submitted by other users in a same profile group to which the user is matched.

4. The method of claim 1, wherein determining the user's preference comprises receiving preference information from the user.

5. The method of claim 1, wherein determining the user's interest comprises:
   extracting a set of keywords from a set of content previously accessed by the user; and
   determining whether a description of the candidate activity matches any of the keywords.

6. The method of claim 1, wherein determining the proximity comprises computing a distance between a location associated with the candidate activity and a location associated with the user.

7. The method of claim 6, wherein determining the proximity further comprises:
   receiving a set of GPS coordinates; and
   computing a motion range for the user.

8. A computer system for recommending leisure activities to a user, the computer system comprising:
   a processor;
   a memory;
   a receiving mechanism configured to receive at least one query for leisure activities, which are associated with a plurality of activity types;
   a collaborative rating mechanism configured to determine a collaborative rating of a candidate activity by other users;
   a preference determination mechanism configured to determine the user's preference for the candidate activity based on a soft query on a set of attributes associated with the candidate activity;
   an interest determination mechanism configured to determine the user's interest for the candidate activity based on the user's past behavior;
   a proximity determination mechanism configured to determine proximity of the candidate activity to the user's current location;
   a composite scoring mechanism configured to generate a composite score for the candidate activity based on the type of the candidate activity and a combination of the collaborative rating, the user's preference, the user's interest, and the proximity of the candidate activity; and
   a recommendation mechanism configured to recommend a list of leisure activities of different activity types based on composite scores of the leisure activities.

9. The computer system of claim 8, wherein while determining the collaborative rating, the collaborative rating mechanism is further configured to receive a set of user-profiling information.

10. The computer system of claim 8, wherein while determining the collaborative rating, the collaborative rating mechanism is further configured to retrieve one or more ratings for the candidate activity submitted by other users in a same profile group to which the user is matched.

11. The computer system of claim 8, wherein while determining the user's preference, the preference determination mechanism is configured to receive preference information from the user.

12. The computer system of claim 8, wherein while determining the user's interest, the interest determination mechanism is further configured to:
   extract a set of keywords from a set of content previously accessed by the user; and
   determine whether a description of the candidate activity matches any of the keywords.

13. The computer system of claim 8, wherein while determining the proximity, the proximity determination mechanism is further configured to compute a distance between a location associated with the candidate activity and a location associated with the user.

14. The computer system of claim 13, wherein while determining the proximity, the proximity determination mechanism is further configured to:
   receive a set of GPS coordinates; and
   compute a motion range for the user.

15. A computer readable storage medium storing instructions which when executed by a computer cause the computer to perform a method for recommending leisure activities to a user, the method comprising:
- receiving one query for leisure activities, which are associated with a plurality of activity types;
- determining by a computer a collaborative rating of a candidate activity by other users;
- determining by the computer the user's preference for the candidate activity based on a soft query on a set of attributes associated with the candidate activity;
- determining by the computer the user's interest in the candidate activity based on the user's past behavior;
- determining by the computer proximity of the candidate activity to the user's current location;
- generating by the computer a composite score for the candidate activity based on the type of the candidate activity and a combination of the collaborative rating, the user's preference, the user's interest, and the proximity of the candidate activity; and
- recommending to the user a list of leisure activities of different activity types based on composite scores of the leisure activities.

16. The computer readable storage medium of claim 15, wherein determining the collaborative rating comprises receiving a set of user-profiling information.

17. The computer readable storage medium of claim 15, wherein determining the collaborative rating comprises retrieving one or more ratings for the candidate activity submitted by other users in a same profile group to which the user is matched.

18. The computer readable storage medium of claim 15, wherein determining the user's preference comprises receiving preference information from the user.

19. The computer readable storage medium of claim 15, wherein determining the user's interest comprises:
- extracting a set of keywords from a set of content previously accessed by the user; and
- determining whether a description of the candidate activity matches any of the keywords.

20. The computer readable storage medium of claim 15, wherein determining the proximity comprises computing a distance between a location associated with the candidate activity and a location associated with the user.

21. The computer readable storage medium of claim 20, wherein determining the proximity further comprises:
- receiving a set of GPS coordinates; and
- computing a motion range for the user.

* * * * *